May 2, 1961 W. D. BUCKINGHAM ET AL 2,982,815

FACSIMILE TRANSMITTER

Filed Feb. 4, 1955 11 Sheets-Sheet 1

FIG. I

INVENTORS
W. D. BUCKINGHAM
N. R. LANE
G. H. RIDGE
F. T. TURNER

BY

ATTORNEY

INVENTORS
W. D. BUCKINGHAM
N. R. LANE
G. H. RIDGE
F. T. TURNER
BY
[signature]
ATTORNEY May 2, 1961 W. D. BUCKINGHAM ET AL 2,982,815

FACSIMILE TRANSMITTER

Filed Feb. 4, 1955 11 Sheets-Sheet 3

INVENTORS
W. D. BUCKINGHAM
N. R. LANE
G. H. RIDGE
F. T. TURNER

BY

[signature]
ATTORNEY

May 2, 1961 W. D. BUCKINGHAM ET AL 2,982,815

FACSIMILE TRANSMITTER

Filed Feb. 4, 1955

11 Sheets-Sheet 4

INVENTORS
W. D. BUCKINGHAM
N. R. LANE
G. H. RIDGE
F. T. TURNER

BY

[signature]
ATTORNEY

May 2, 1961 W. D. BUCKINGHAM ET AL 2,982,815

FACSIMILE TRANSMITTER

Filed Feb. 4, 1955 11 Sheets-Sheet 5

INVENTORS
W. D. BUCKINGHAM
N. R. LANE
G. H. RIDGE
F. T. TURNER

BY

[signature]
ATTORNEY

May 2, 1961 W. D. BUCKINGHAM ET AL 2,982,815

FACSIMILE TRANSMITTER

Filed Feb. 4, 1955 11 Sheets-Sheet 6

INVENTORS
W. D. BUCKINGHAM
N. R. LANE
G. H. RIDGE
F. T. TURNER

BY [signature]

ATTORNEY

FACSIMILE TRANSMITTER

Filed Feb. 4, 1955

11 Sheets-Sheet 7

INVENTORS
W. D. BUCKINGHAM
N. R. LANE
G. H. RIDGE
F. T. TURNER

BY R. F. Presson

ATTORNEY

May 2, 1961 W. D. BUCKINGHAM ET AL 2,982,815

FACSIMILE TRANSMITTER

Filed Feb. 4, 1955 11 Sheets-Sheet 8

INVENTORS
W. D. BUCKINGHAM
N. R. LANE
G. H. RIDGE
F. T. TURNER

BY [signature]
ATTORNEY

May 2, 1961 W. D. BUCKINGHAM ET AL 2,982,815

FACSIMILE TRANSMITTER

Filed Feb. 4, 1955 11 Sheets-Sheet 9

INVENTORS
W. D. BUCKINGHAM
N. R. LANE
G. H. RIDGE
F. T. TURNER

BY

H. F. Presson
ATTORNEY

INVENTORS
W. D. BUCKINGHAM
N. R. LANE
G. H. RIDGE
F. T. TURNER
BY
V. F. Presson
ATTORNEY INVENTORS
W. D. BUCKINGHAM
N. R. LANE
G. H. RIDGE
F. T. TURNER
BY
[signature]
ATTORNEY United States Patent Office 2,982,815
Patented May 2, 1961

2,982,815

FACSIMILE TRANSMITTER

William D. Buckingham and Norman R. Lane, Southampton, Guy H. Ridge, Water Mill, and Frank T. Turner, Hampton Bays, N.Y., assignors to The Western Union Telegraph Company, New York, N.Y., a corporation of New York Filed Feb. 4, 1955, Ser. No. 486,252

11 Claims. (Cl. 178—7.1)

This invention relates to facsimile transmitters embodying scanning apparatus adapted for optical flat-sheet scanning of letters, telegrams or other message sheets bearing the subject matter to be transmitted, and more particularly to such scanning apparatus in which message sheets that respectively vary in length or width, or with respect to which the length or width of the subject matter thereon varies, may be scanned more expeditiously.

The instant invention represents an improvement over the scanning apparatus disclosed in the copending U.S. application of W. D. Buckingham, Serial No. 454,750, filed September 8, 1954, now Patent No. 2,903,512, and assigned to the assignee of the instant case.

One of the objects of the invention is the provision of flat-sheet scanning apparatus in a facsimile transmitter in which letters, telegrams or other sheets bearing messages of different lengths may be scanned optically without the loss of time normally occasioned when scanning those portions of the sheets preceding and following the message subject-matter to be transmitted.

Another object is to provide scanning apparatus in which sheets of different widths may be scanned transversely by an oscillating light beam that traverses a scanning path of predetermined length, and in which means are provided for automatically generating "blanking" signals for preventing the transmission of background facsimile signals whenever the scanning beam has passed off the surface of a sheet being scanned whose width is less than the length of the scanning path traversed by the light beam.

A further object is the provision of flat-sheet scanning apparatus in a facsimile transmitter in which subject-matter sheets are advanced at a predetermined rate when the subject matter on the sheets is being scanned, and in which transmission of facsimile pickup signals is prevented when those portions of the sheets preceding and following the subject matter are passing the scanning path, thereby to substantially reduce the signal line time required to transmit a message.

An additional object is the provision of reject mechanism operable at any time while a message sheet is in the transmitter, either before or during the time that the message sheet is progressing through the transmitter, for preventing transmission or for causing transmission to cease if it has started, and which also causes continuous fast feed of the message sheet until it has passed completely through the transmitter.

Another object is to provide a collector system for the scanning light reflected from a message sheet, that captures some of the reflected light that ordinarily would be lost, thereby to provide an increase in the total quantity of light that falls on the pickup photocell structure of the system.

The apparatus of this invention embodies scanning apparatus in which a letter or other message sheet may be placed on the loading platform of the sheet-feeding unit, and the sheet is manually positioned or advanced until the beginning of the subject-matter thereon is directly beneath the first of a group of feed rollers. An adjustable end-of-message indicator is manually set to correspond to that place on the sheet where the subject matter ends. Prior to scanning the subject matter on the sheet, and as soon as scanning of the subject matter is completed, transmission of facsimile signals over the outgoing line is automatically prevented. The subject matter sheets are advanced from the loading platform by means of rollers and guides and are caused to pass in a vertical plane across an end of the sheet-feeding unit where the subject-matter is scanned by an oscillating light beam that passes through a scanning aperture in the unit that embodies the scanning beam structure. The sheets are advanced at a fast rate through the apparatus until the beginning of the subject matter on the sheets to be transmitted reaches the scanning aperture, at which time the rate of feed is reduced to the proper scanning speed. When the subject matter has been scanned, the sheets are again advanced at a fast rate, and are delivered into a "sent message" compartment in the sheet-feeding unit.

The scanning unit contains a point source of light whose beam is interrupted by a chopper disk to generate a carrier frequency and is reflected by a spherical mirror that is oscillated to cause the light beam to sweep back and forth through a scanning aperture to scan the subject matter on a message sheet as it is advanced by the sheet-feeding unit. With the sheet-feeding and scanning units in their operative juxtaposed position, the source of light and also the surface of the subject-matter sheet where the scanning beam impinges are each located so as to be substantially at the optical center of curvature of the spherical mirror. The density of the light beam reflected from the subject-matter sheet varies in accordance with the density of the subject matter being scanned, and is directed by means of a cylindrical reflector onto two photocells in such manner that the light thus reflected is focused along a line extending over substantially the entire length of the light-sensitive areas of the photocells. The light that ordinarily would be reflected past the ends of the cylindrical reflector and hence lost so far as the photocells are concerned, is captured and reflected by mirrors back onto the cylindrical reflector so that it falls on the photocells, thus substantially adding to the total quantity of light received by them.

When, as may frequently occur, the width of a subject-matter sheet is less than the length of the scanning path, the scanning beam will sweep past the edge of the sheet, and heretofore this would cause signals to be transmitted which represent a different color from that of the background of the sheet, thus resulting in unsightly corresponding areas, usually black, on the recording sheet at the receiving station. To obviate this, a cylindrical blanking mirror and a blanking photocell are provided, so that whenever the scanning beam is off the sheet, tthe blanking mirror will reflect the beam onto the blanking photocell and produce signals that are used to prevent the transmission of background signals at such time. This enables transmission to be effected from any size blank from the widest that will pass through the apparatus down to narrower widths of any size, without resulting in unsightly dark or black areas in the background of the recorded copy at a facsimile receiver.

The invention will be more fully understood from the following detailed description of an illustrative embodiment thereof, taken in connection with the accompanying drawings in which.

Figure 1:
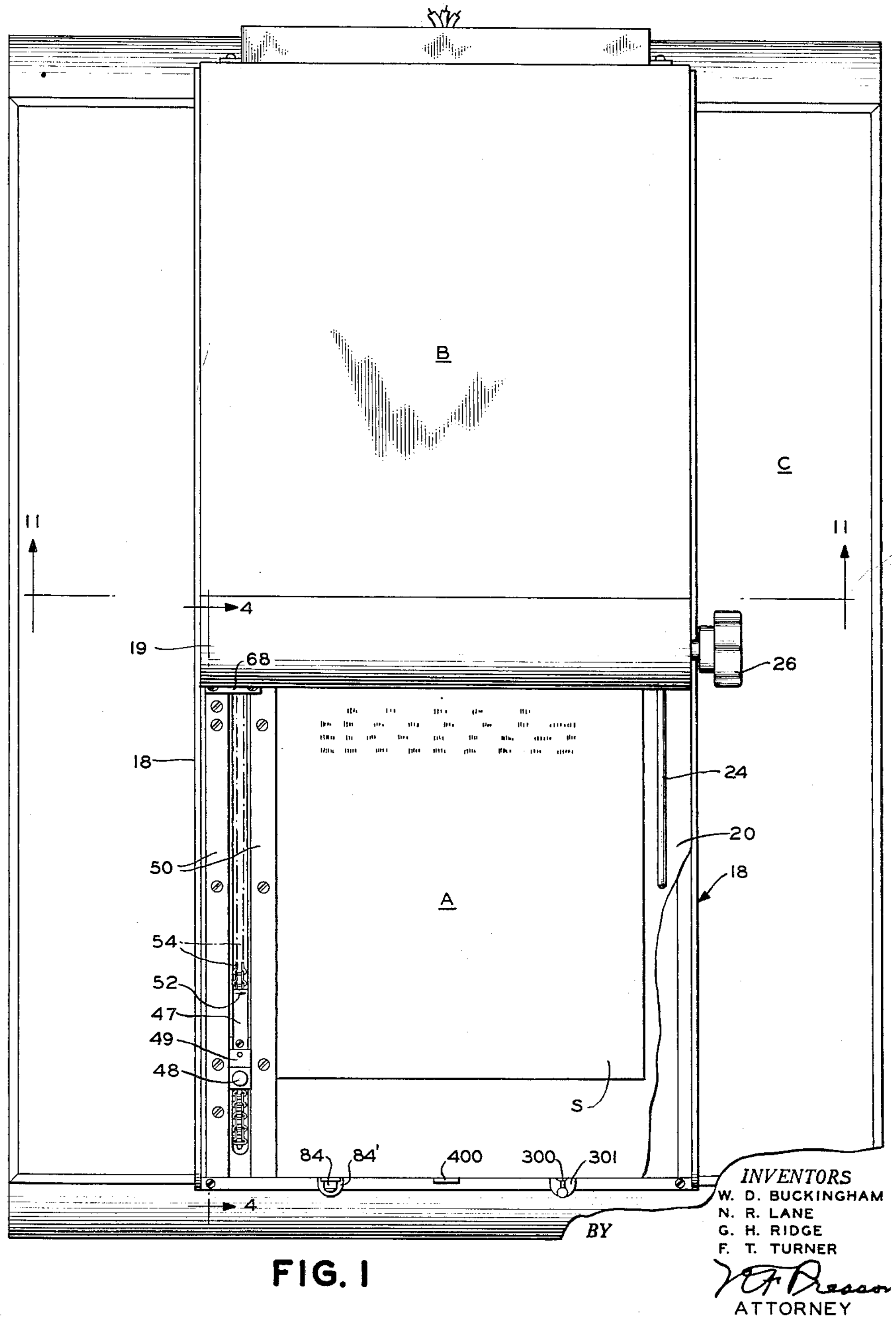
Fig. 1 is a top plan view of the separable sheet-feeding and scanning units of the machine in their respective front and rear operative positions for effecting a transmitting operation.

Fig. 1 of the drawings shows the two units A and B of the apparatus in juxtaposed operative position, the front unit A embodying the sheet-feeding apparatus, and the rear unit B embodying the scanning beam apparatus. The units are mounted on guide rails 18 of a supporting framework which may be mounted on a table or other support, preferably on a cabinet C in which the facsimile power and control equipment is contained. The unit A may readily be slid forward since it is slidably mounted on the guide rails for easy removal, and the scanning beam apparatus is contained within a removable tray received within a fixed light-proof housing for the rear unit B, whereby either or both of these units may be removed for inspection, adjustment or replacement purposes.

*Sheet feeding unit*

The sheet-feeding unit A has a loading platform 20 on which is placed a letter, message blank or other sheet bearing subject matter to be transmitted by facsimile, the sheet being placed with the subject matter on the upper side thereof so that it is in view of the person wishing to send a message. With the message sheet on the loading platform, a pressure feed roller 22, which is positioned below a cowl 19, Figs. 2 to 4 and 9, may be manually raised by means of a lever 24, and the leading end of the sheet is inserted under the roller 22 to a predetermined desired point, for example, the point where the first line or portion of the message to be transmitted is immediately beneath the roller. In the event that the first line of the message is so far from the leading end of the message sheet that it can not readily be fed in by hand, the leading end is inserted beneath the roller 22 and the lever 24 is returned to its downward position, and the sheet is then advanced manually by turning a knob 26, Figs. 1 and 3, until the sheet is properly advanced. The pressure feed roller 22 is rotatably mounted on a shaft 28, Figs. 3 and 4, and on both ends of the shaft are eccentric cams 30 having lobes 31 which engage plates 34 when the shaft 24 is raised, in order to maintain the roller in raised position. The shaft 28 is mounted in L-shaped bearings 36 which in turn are rotatably mounted on a stationary shaft 38. The shaft 38 is mounted in supports 40 secured to a frame member 44. Coiled springs 42, Figs. 2 and 4, resiliently urge the bearings 36 in a clockwise direction, as seen in Fig. 4, and bias the roller 22 either to its upper position or its lower position. The roller 22 must be lowered before the apparatus is operative under control of an interlock switch 46, Fig. 2, mounted on the frame member 44, thereby to insure that the message is gripped by feed rollers 22 and 104. The operative position of the switch is controlled by the right hand bearing member 36; when the handle 24 is in any position other than its sheet-feeding position, the switch contacts are open.

Figure 2:
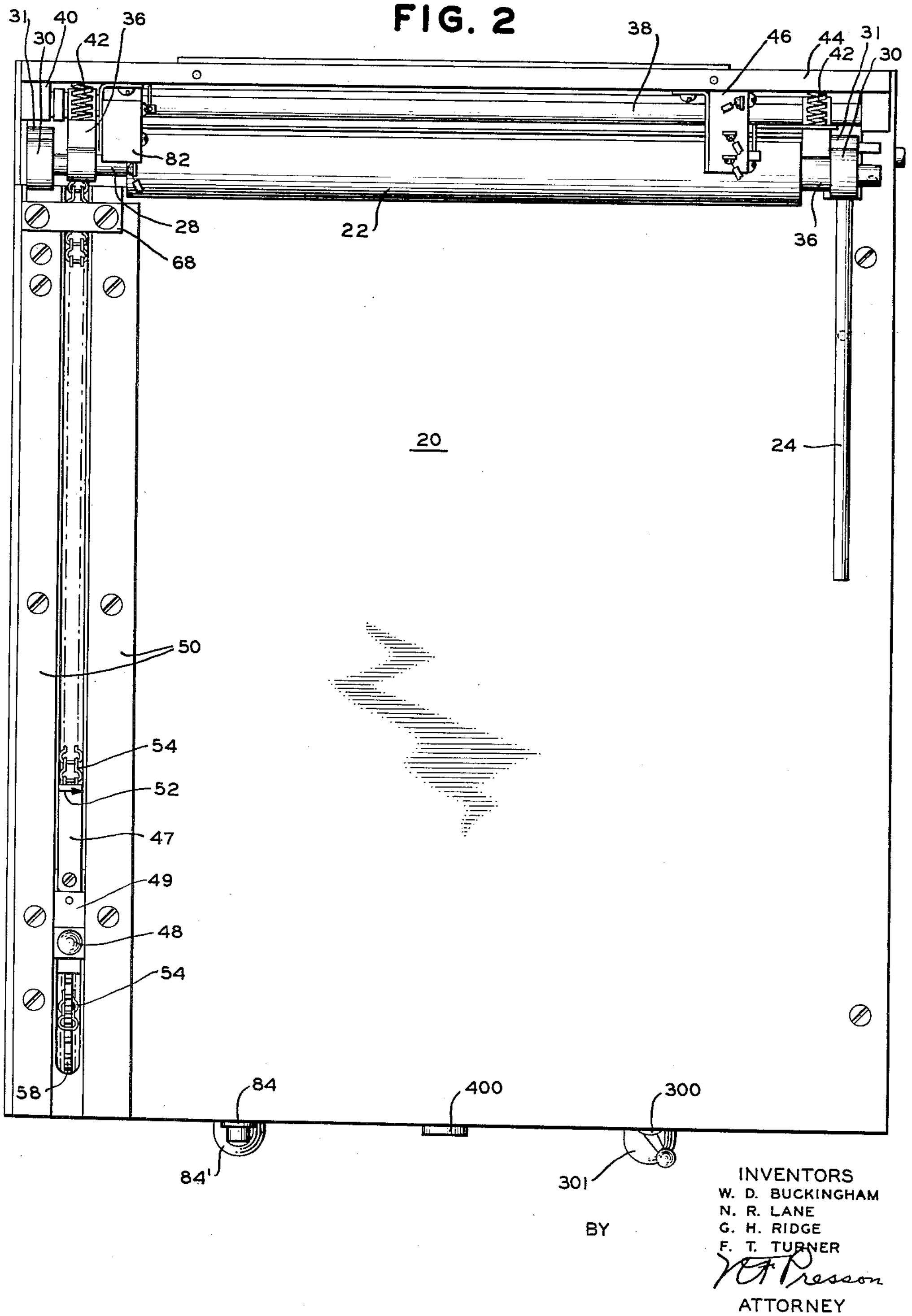
Fig. 2 is an enlarged top plan view of the sheet-feeding unit, with its top protective cover plate removed in order to show certain details of the feed roller structure.

An end-of-message indicator carriage 47 is slidably mounted in a T-shaped slot formed by two rail members 50, Figs. 1 and 2. The indicator carriage is manually moved in the slot, by means of a knob 48, until the arrow 52 on the carriage appears just below the last line of the subject matter on the sheet *s*. This carriage is secured to an endless chain 54 and movement of the carriage causes the chain to rotate a gear wheel 56, Fig. 4, by means of a sprocket 58 and gear 60. Normally the carriage 47 is at the end of its forward travel where it has been stopped by reason of a shoulder 49 thereof abutting a stop member 68 at the end of a preceding transmission, and at this time a pin 62 carried by the gear wheel 56 has engaged the actuating arm 64 of a switch 66, and has actuated the switch to its operated open-circuit position. When gear wheel 56 is rotated, the pin 62 carried thereby is disengaged from the actuating arm 64 of the switch 66, thereby restoring the switch to its unoperated position.

When the end-of-message carriage 47 is manually pulled back and set to its selected starting position, this determines the length of the transmission. Transmission can not be initiated, and the transmitter is inoperable, until the switch 66 has been closed by the setting of the end-of-message carriage. If the carriage is pulled back to its extreme position, a switch 70, Figs. 4 and 6, has its actuating arm 72 engaged by a pin 74 on the gear wheel 56 (which was rotated counterclockwise as seen in Fig. 4) and the switch is actuated to its operate position. This provides for continuous, or uninterrupted, transmission of a message until the trailing end of the subject-matter sheet has passed an actuating arm 80 of a switch 82, Figs. 4 and 9, releasing the arm and allowing the switch to return to its unoperated position as seen in Fig. 4. The sheet passes around paper guides 75 and between wire paper guides 76 and 77, and thence through a chute 78 and into a "message sent" receptacle 187. This arrangement enables a message of indeterminate length to be transmitted or a series of successive individual messages, as on overlapping sheets, to be continuously transmitted.

Figure 3:
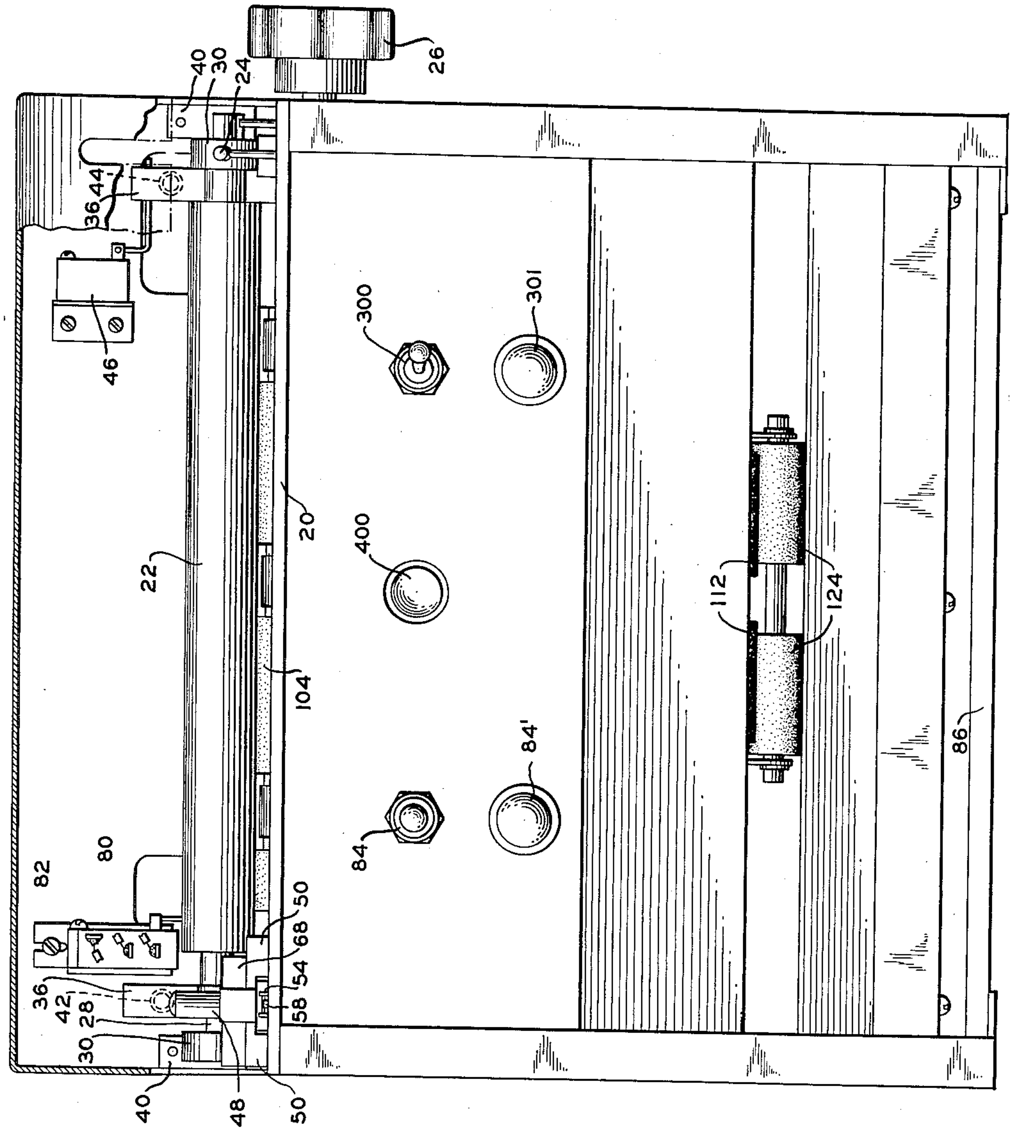
Fig. 3 is a front view, in elevation, of the unit of Fig. 2.
Figure 4:
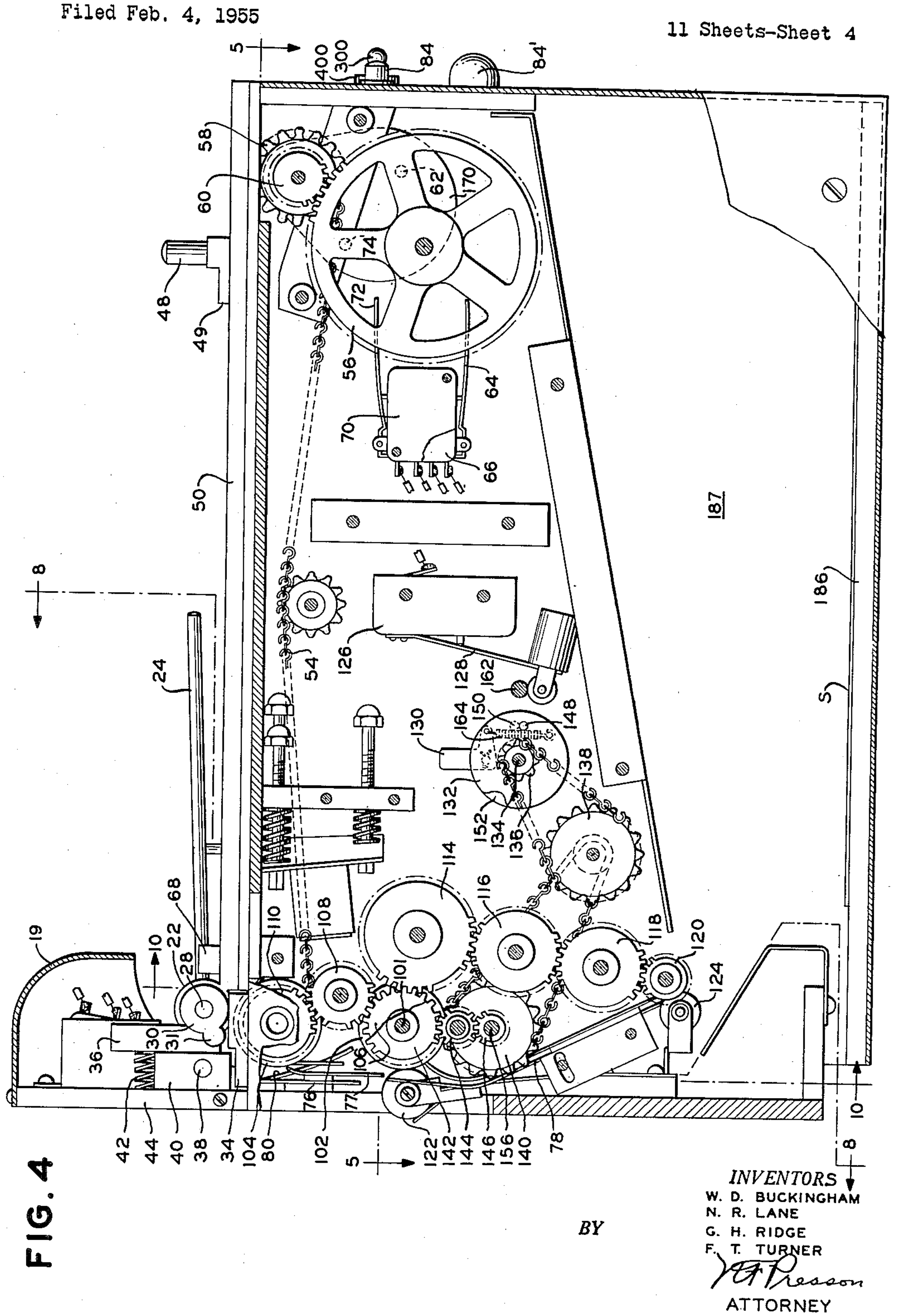
Fig. 4 is a sectional view of the sheet-feeding unit taken along the line 4—4 of Fig. 1.
Figures 5, 6:
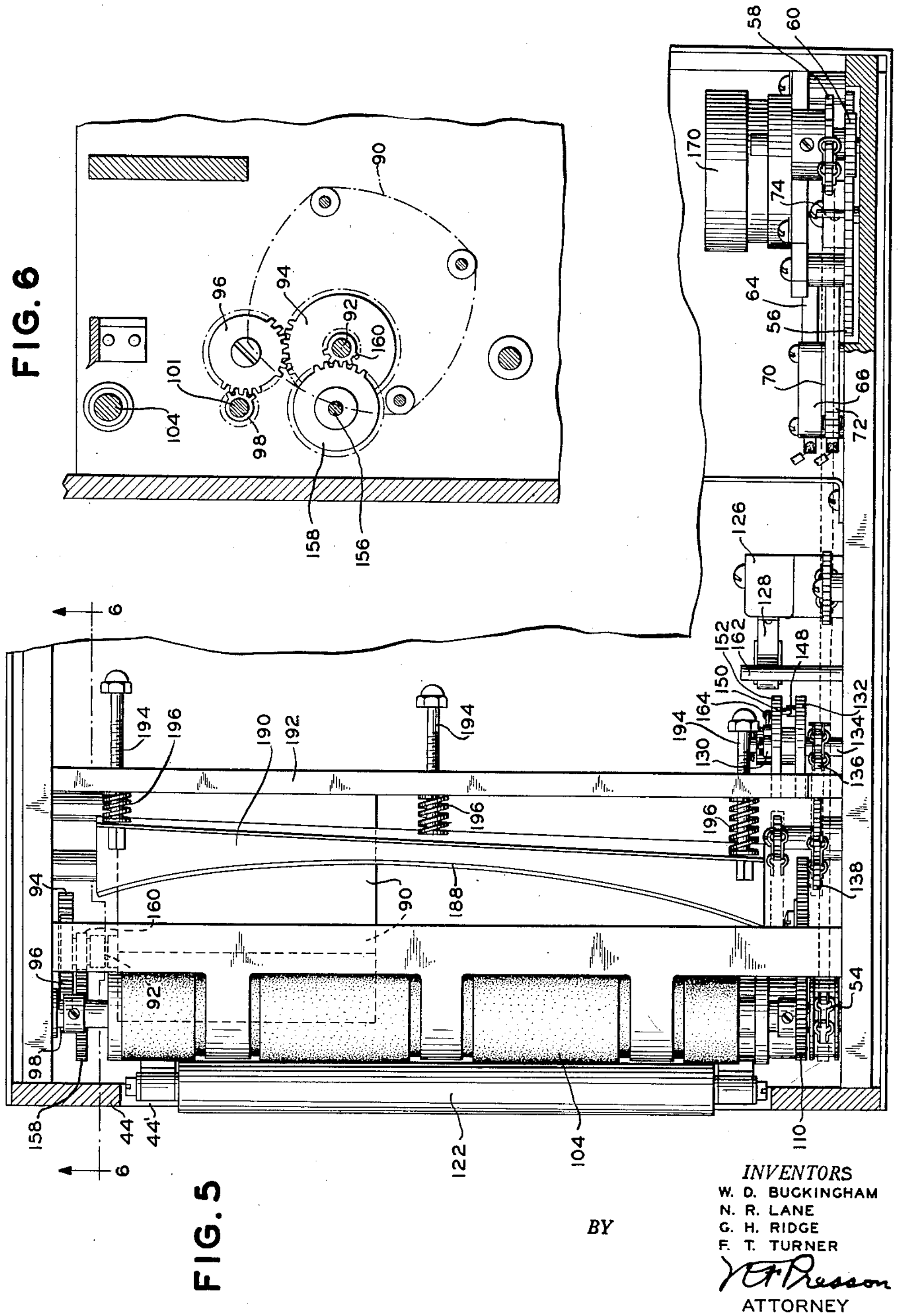
Fig. 5 is a sectional view taken along the line 5—5 of Fig. 4.
Fig. 6 is a sectional view taken along the line 6—6 of Fig. 5.
Figure 7:
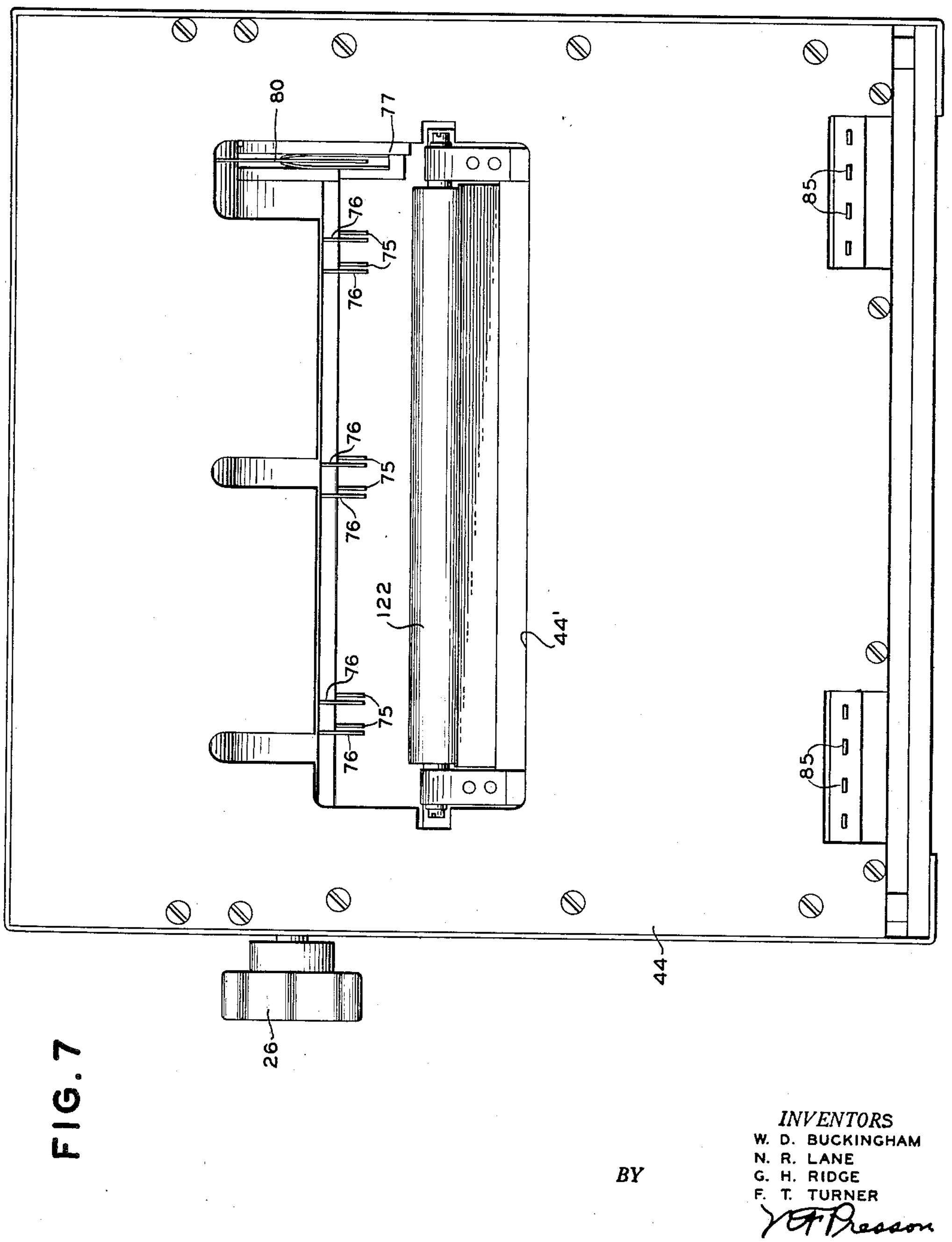
Fig. 7 is a rear end view, in elevation, of the sheet-feeding unit.
Figure 9:
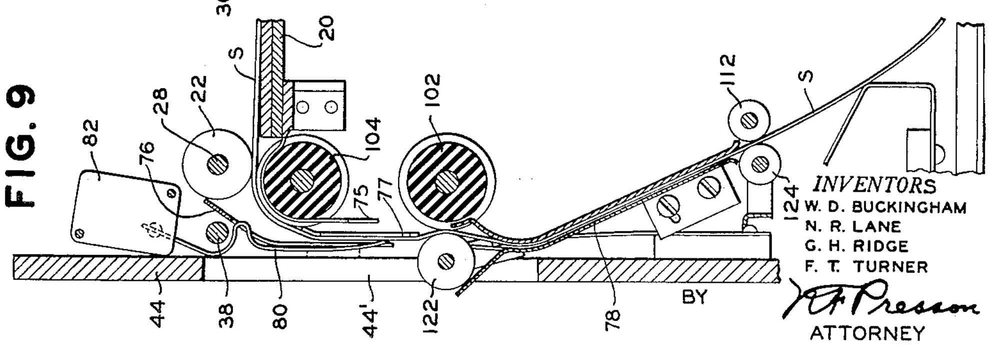
Fig. 9 is a fragmentary detailed view of the sheet feeding and guide structure seen in Fig. 4, and illustrating the path of a sheet as it is fed through the guide structure.
Figure 10:
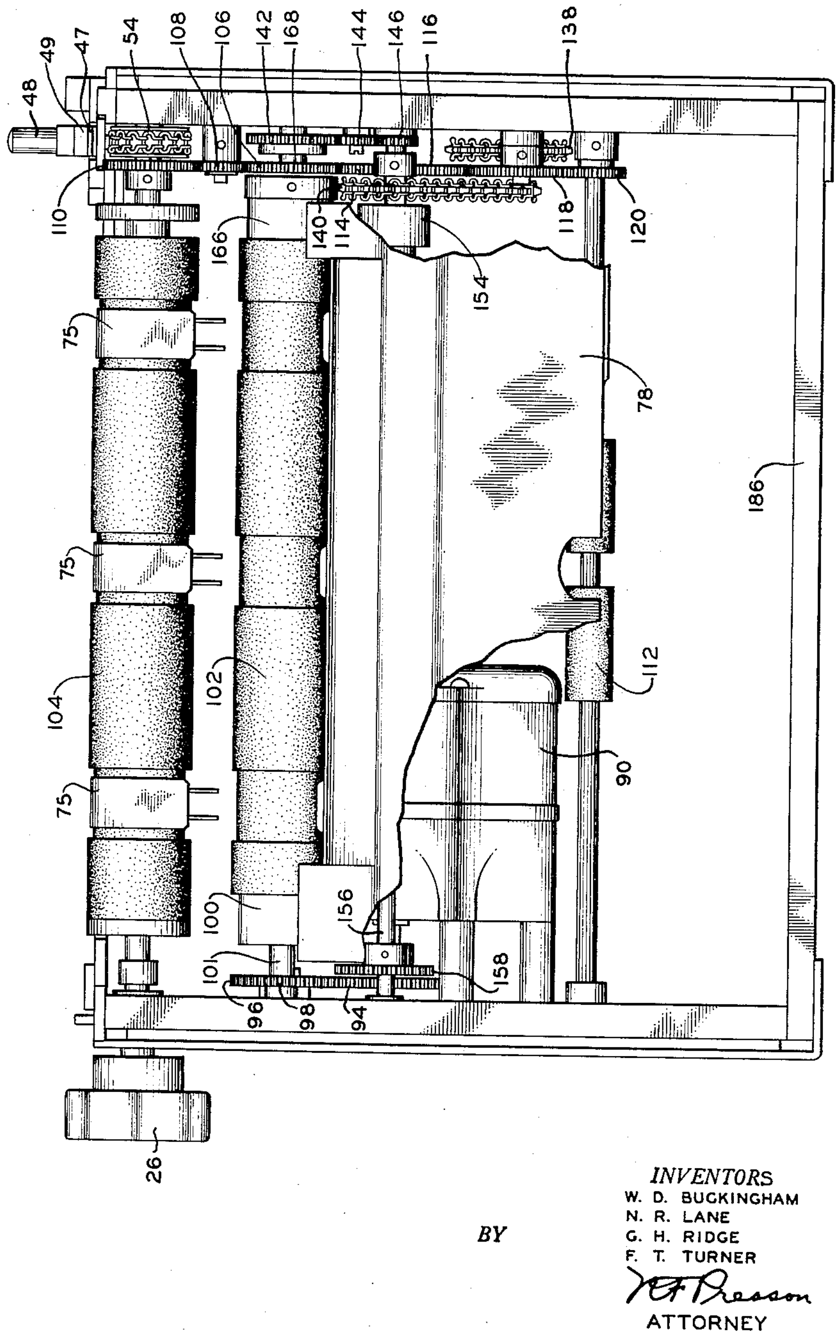
Fig. 10 is a sectional view taken along the line 10—10 of Fig. 4.

Assuming that a single message, such as that on the sheet *s* of Fig. 1, is to be transmitted, a start button 84 seen in Figs. 2 and 3 is pushed, and this causes a relay in the associated control equipment in cabinet C to operate and energize a scanning motor 210, Fig. 12, and also a motor 212 which drives a chopper wheel 214, in the scanning unit B, hereinafter described, thereby to interrupt the light beam from a lamp 216 and generate a carrier frequency that is modulated in accordance with the amount of light reflected from a message sheet during a scanning operation. After the lapse of a certain time period, as determined by a timer in the associated control equipment, a paper fed A.C. reversible motor 90, Figs. 5 and 6, is energized and rotates in a direction to effect fast paper feed of the message sheet *s* until the top line of the subject matter to be scanned appears at a scanning aperture 44′ in the plate member 44, seen in Figs. 7 and 9. Power is transmitted from the shaft 92 of the motor 90, Figs. 5 and 6, through a gear train comprising gears 94, 96 and 98, to an overrunning clutch 100, Fig. 10, which is mounted on a stub shaft 101, and rotates a feed roller 102. A second roller 104 is driven from the paper feed roller 102 by means of three gears 106, 108, 110. Another paper feed roller 112 is driven from roller 102 by means of gears 106, 114, 116, 118 and 120. The feed roller 104 is associated with the pressure feed roller 22; feed roller 102 is associated with a pressure roller 122, Figs. 4 and 9; and feed roller 112 is associated with a pressure roller 124. The path of a message sheet *s* through the various feed and pressure rollers and guide members is indicated in Fig. 9.

A flip switch 126, Figs. 4 and 5, has its actuating lever 128 operated by a spring-loaded rotatable lever 130 that is carried by a rotatable disk 132 mounted on a fixed shaft 134. The disk 132 carries a pin 148 which is engageable by a pin 150 carried by a second disk 152. The second disk is rotated, in a clockwise direction as viewed in Fig. 4, by means of chain sprockets 136, 138 and 140. The sprocket 140 is driven by an overrunning clutch 154, Figs. 5 and 10, from a countershaft 156 which in turn is rotated by gears 158 and 160 from motor shaft 92, Fig. 6. Rotation of the second disk 152 causes rotation of the disk 132, Fig. 4, when the pins 148 and 150 are in engagement with each other. As the disk 132 is rotated, its lever 130 engages a fixed pin 162 mounted on the frame, and the lever is retracted and extends a spring 164 until the lever passes the pin 162, at which time the lever is released and caused to momentarily operate the flip switch 126 through the loaded actuating arm 128. The momentary operation of the switch 126, through a relay circuit hereinafter described, causes the feed motor 90 to reverse at the precise instant that the first line of the subject matter to be scanned appears at the scanning line position, which is approximately at the center of the scanning aperture 44', thereby to effect relatively slow speed of the message sheet during a scanning operation.

The manner in which the reversal of rotation of the motor effects a change from fast paper feed to the slower scanning paper feed is as follows: The gear ratio established by gears 94, 96 and 98, Fig. 6, is such as to impart to the feed rollers a speed several times that imparted by gears 160 and 158 and counter shaft 156, and gears 146, 144 and 142, Fig. 4. The right hand end of feed roller 102 has associated therewith an overrunning (scanning feed) clutch 166, Fig. 10, mounted on a stub shaft 168 which is driven through gears 142, 144 and 146 from the countershaft 156. For a given direction of revolution of the feed motor, the number of gears in one train of the foregoing gears imparts a forward motion to the driving element of its associated overrunning clutch, while the number of gears in the other train of gears is such as to impart a reverse motion to the driving element of its associated overruning clutch. Hence for a given direction of the motor one clutch is operative to drive and the other is inoperative to drive, and for a reverse direction of rotation of the motor the action of the clutches is reversed. This enables a reversible synchronous motor to be used for normal paper feed, which is essential to uniform progression of the message sheet feed during scanning operation, and also enables the same motor to be used for the fast paper feed operation.

At the instant that the direction of rotation of the paper feed motor 90 is reversed, due to operation of the flip switch 126, to effect the slower scanning paper feed, another A.C. synchronous timer motor 170, Figs. 4 and 5, is energized by relay means in the control circuit. This drives the chain 54 by means of sprocket 58, and also drives gear 56 by means of gear 60. The end-of-message indicator carriage 47 is thereby caused to be advanced towards its initial position (against the stop member 68) as scanning proceeds. In addition, gear 56 is rotated in a clockwise direction, as viewed in Fig. 4, and scanning at the scanning feed rate continues until the pin 62 on gear 56 operates the switch 66 by means of the actuating arm 64. Thus, the point at which transmission has terminated is determined by the original setting of the gear 56 as established by the position of the end-of-message indicator carriage 47 which was adjusted manually prior to the start of the transmission. The movement of gear 56 is synchronous with the movement of the feed rollers. Upon operation of switch 66, relay means in the control circuit cause the feed motor 90 to again reverse its direction of rotation, thereby causing fast feed of the message sheet immediately following completion of transmission of the subject matter thereon.

Figure 8:
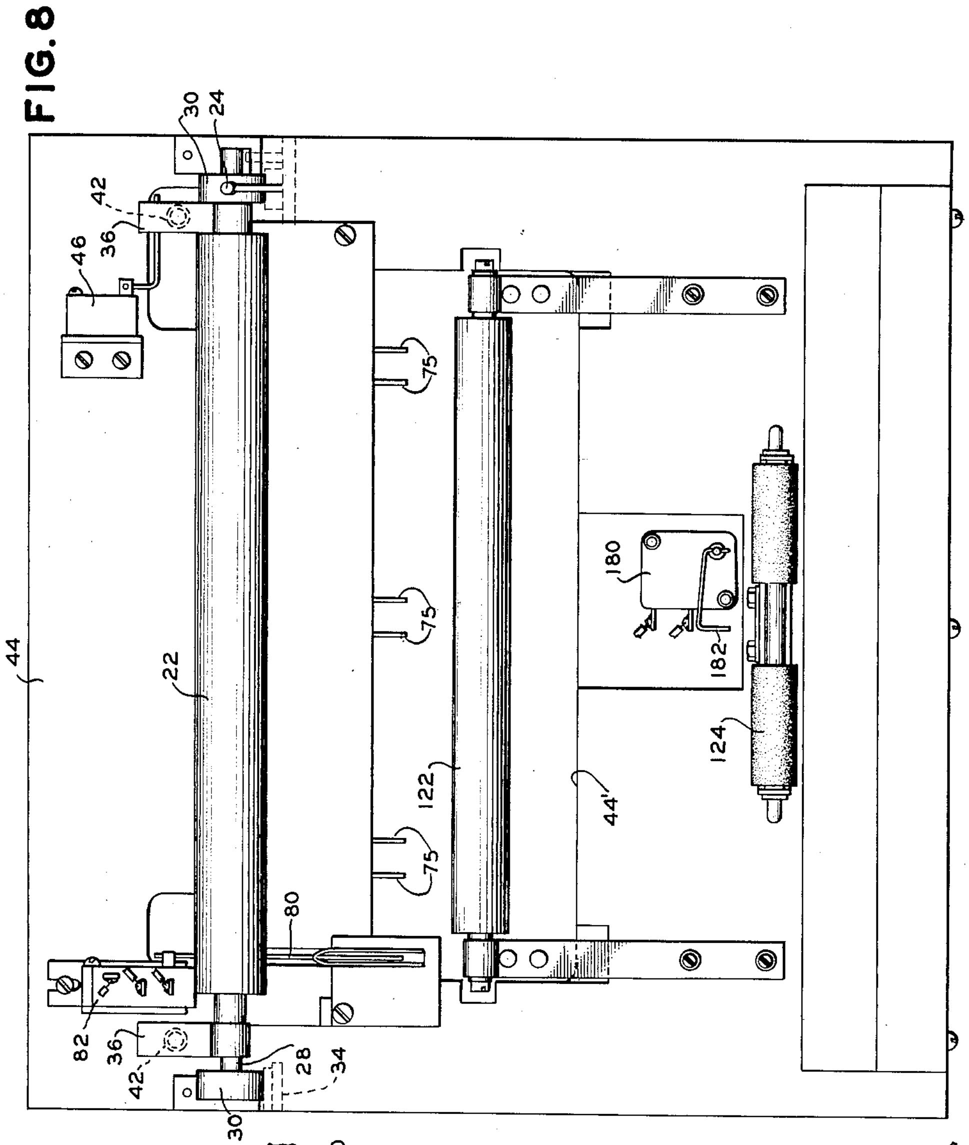
Fig. 8 is a sectional view taken along the line 8—8 of Fig. 4, with the protective cover plate removed.

As previously set forth, fast feed operation of the feed rollers also causes rotation of the disk 152 which carries the lever 130 and operates switch 126 once for each revolution of the disk representing a feeding movement of the message sheet a distance of approximately one and one-half inches. Switch 126 initially does not produce any change in the relay means in the control circuit since the switch is effectively disabled until the switch 82, operated by arm 80, Fig. 9, and a switch 180, Fig. 8, which is operated by an actuating arm 182, both show the absence of paper. The fast feed, or end-of-message condition, following a transmission therefore continues until the subject-matter sheet has passed the actuating arm 182 thereby releasing the arm and permitting the switch 180 to return to its unoperated condition.

The next subsequent operation of switch 126 by the lever 130 activates relay control equipment to deenergize motors 90 and 170. At the same time the relay equipment applies a direct current of short duration to the motor 90, causing the same to be decelerated rapidly to rest by dynamic braking effect, and prevent coasting of the motor thereby insuring that the length of paper fed in at the start of a subsequent transmission may be determined accurately by the switch 126 and its actuating means. The timing of the foregoing short pulses may be effected in any known manner, but preferably is obtained by the discharge time of a condenser in relay control equipment, and has a duration of a fraction of a second. The equipment has now returned to its initial condition in readiness for another transmission.

In the event that the clerk or other attendant sending the message discovers that the wrong message has been inserted, or that the message is being sent to the wrong receiving station, or for any other reason desires to prevent or stop transmission, this may be done at any time, either before transmission has started or while the message sheet is progressing through the transmitter, by manually pushing the "reject" button 400 (Fig. 3). When this button is pushed, the end-of-message condition obtains and fast feed of the message sheet is effected until the sheet has passed completely through the transmitter, after which the message sheet passes to the "sent message" compartment of the apparatus. During the time that the fast feed is in progress, the outgoing transmission line is short-circuited and the transmitter is turned off; the apparatus is returned to its initial condition and in readiness to receive the next message sheet.

When the end-of-message carriage 47 is manually pulled back to the front end of the unit, successive messages may be fed continuously through the apparatus since the scanning paper feed at this time is continuous. When the end-of-message carriage is set so that its indicator 52 is at the end of a message or other subject matter on a sheet, paper feeding will stop when the message has cleared the scanning aperture. If a long message is to be transmitted, the end-of-message carriage is manually pulled back to the full extent of its travel at the start of a message. In either case the pin 74 on gear wheel 56, Fig. 4, is thereby caused to operate switch 70 by means of its actuating arm 72. Operation of the switch energizes relay means in the control circuit so as to effectively disable the switch 66 and transfer its function to the switch 82 so that the latter switch, through its arm 80, will be controlling. Transmission now will continue until the end of a long message, or until the end of the last of a succession of message blanks, has passed the actuating arm 80 of the switch 82 to release the switch and allow it to return to its unoperated condition, thereby causing the associated means to initiate fast feed as described previously in connection with the operation of switch 66. When transmitting a long message or a continuous succession of messages, the end-of-message carriage will have returned to its initial starting position and is restrained from further movement by the stop member 68, and this will cause the timer motor 170 to stall, the motor being of the type that is not injured by stalling. The remainder of the operation for a long message or for a continuous succession of messages is the same as that hereinbefore described for a short message. As the message sheets leave the feed rollers 112 and 124, they are deposited onto the floor 186, Fig. 4, of the "sent message" compartment 187 where the message sheets may readily be removed from the front of the unit by an attendant.

The only element in the paper feed unit that is directly involved in the optical scanning system is a cylindrical "blanking" mirror 188, seen in Fig. 5, and which is disposed directly opposite the scanning aperture. The mirror is secured to a metal frame 190, the frame being supported by a fixed bar 192 which receives threaded adjusting screws 194, the inner ends of which are secured to the frame 190. There are three of these adjusting screws arranged in the form of a triangle, with helical expansion springs 196 around the screws, whereby the cylindrical reflector 188 is firmly held in any adjusted position. The arrangement provides for a universal adjustment of the mirror with respect to the optical system. As hereinbefore stated, when the width of a subject-matter sheet is less than the length of the scanning path of the scanning light beam, the scanning beam will sweep past the edge of the sheet. However, when this occurs the scanning light beam will be reflected by the cylindrical blanking mirror back onto a blanking photocell in the scanning unit and thus generate blanking signals that control the transmitting circuit in a manner to suppress transmission of facsimile pickup signals at such times. This may be effected by controlling a blanking modulator circuit or a blanking rectifier circuit, as hereinafter set forth. Also, the mirror 188 and the blanking photocell will suppress the transmission of facsimile pickup signals in the event that the scanning beam should be operative in the absence of the message sheet at the scanning aperture. In either case the presence of unsightly black or dark areas in the background of any recorded copy at a facsimile receiver is obviated.

*Scanning unit*

Figure 11:
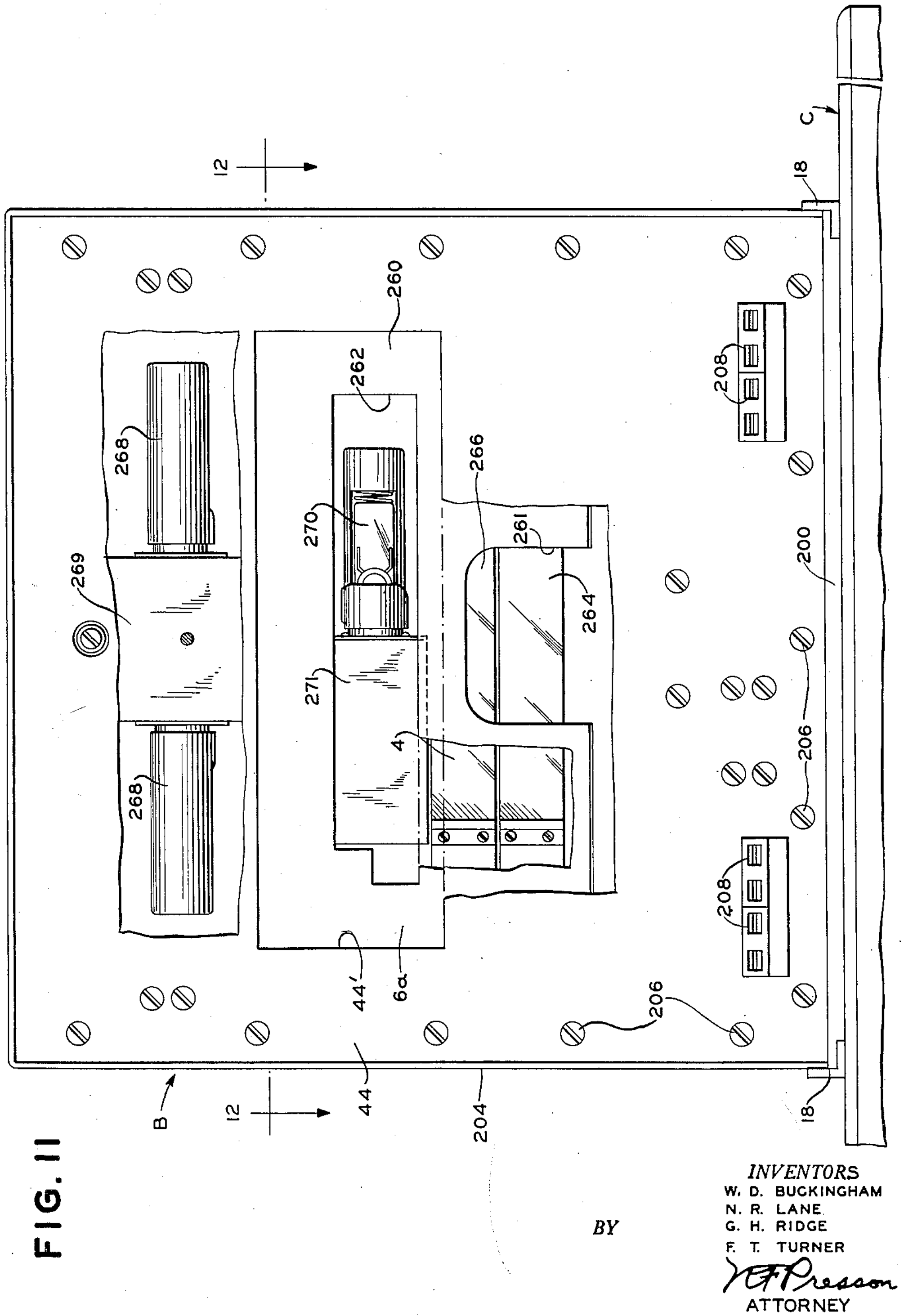
Fig. 11 is a front view, in elevation, of the scanning unit, looking in the direction of the arrows 11—11 of Fig. 1, with the front wall of the unit partly broken away to disclose certain details of the optical scanning structure embodied therein.
Figure 12:
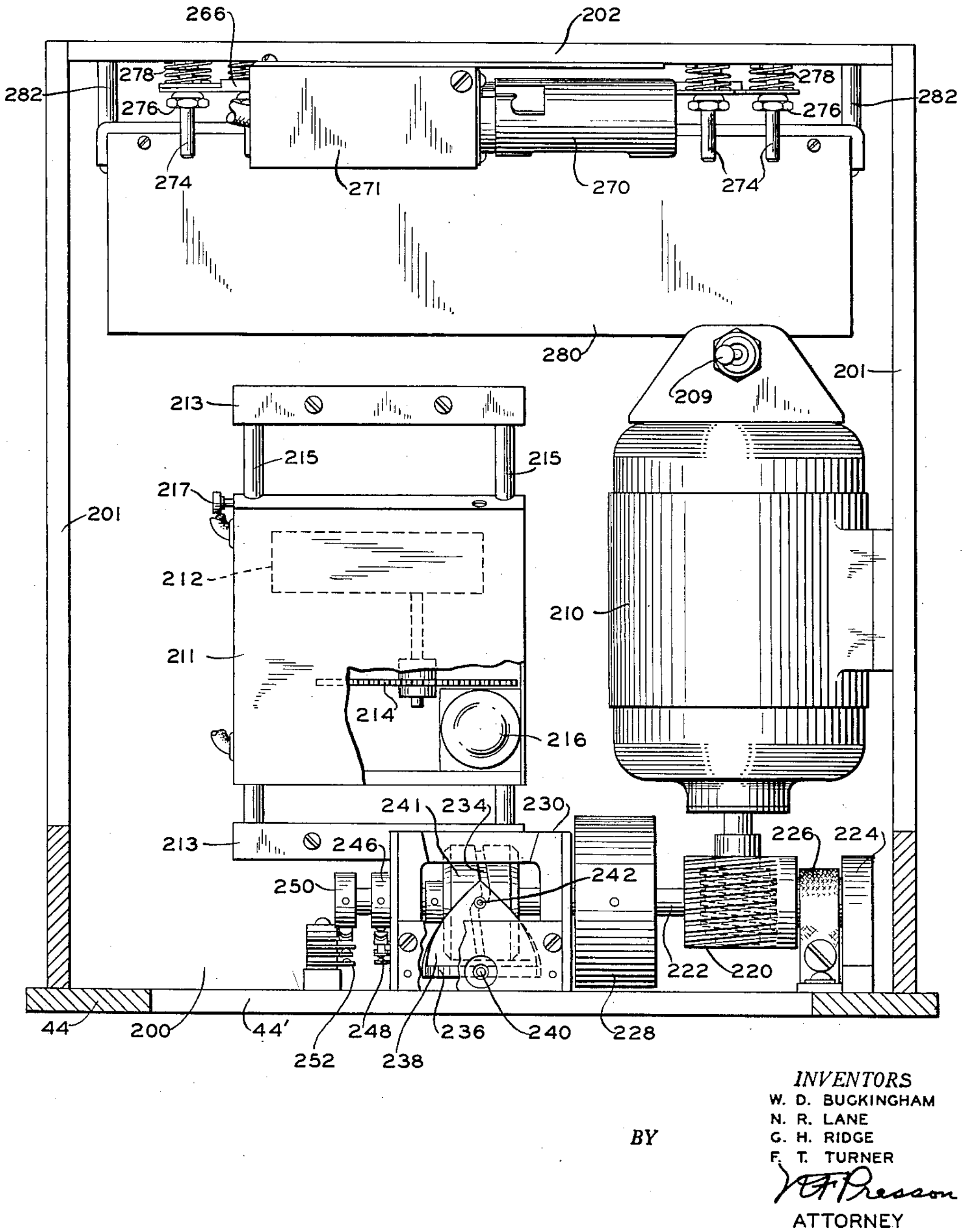
Fig. 12 is a sectional view taken along the line 12—12 of Fig. 11, with a fixed cylindrical mirror removed in order to show the drive mechanism of the scanning unit.
Figures 14, 15:
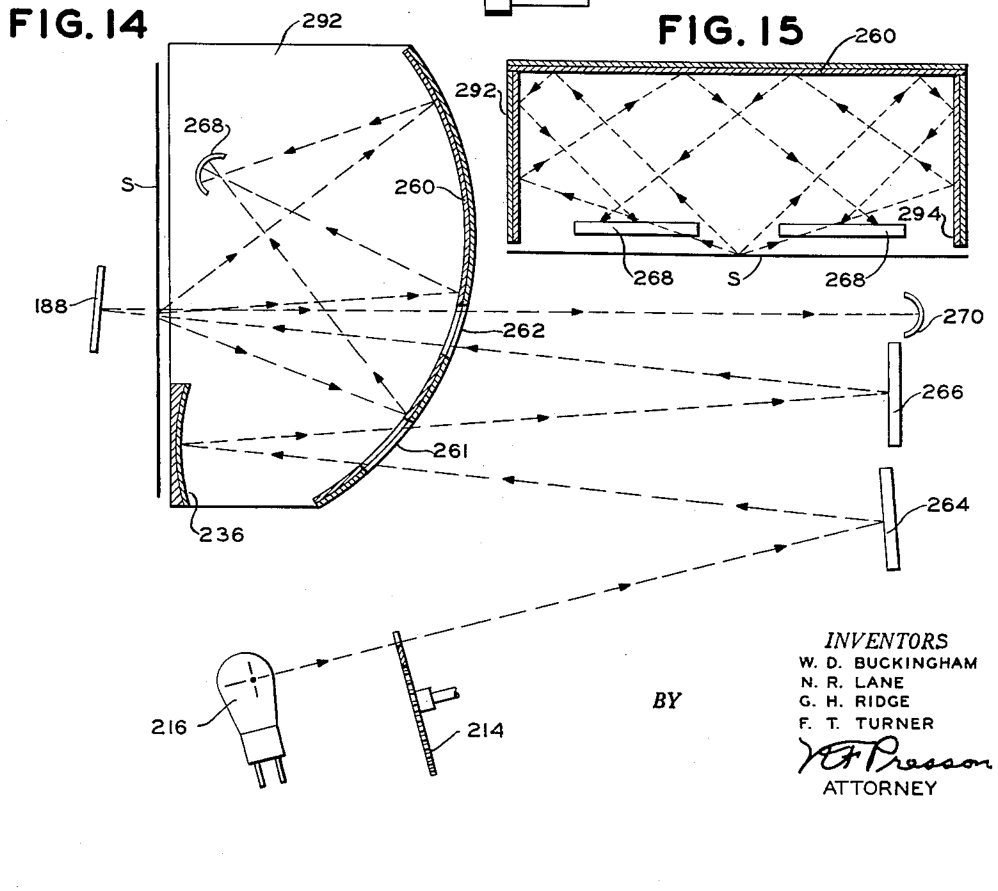
Fig. 14 is a diagrammatic view of the optical system of the scanning unit.
Fig. 15 is a fragmentary view of the optical system of Fig. 14, showing how certain of the light rays reflected from the subject matter being scanned are deflected by a cylindrical mirror and also by side mirror surfaces.

Figs. 11 and 12 show the physical arrangement of various elements of the scanning unit B for producing the oscillating light beam that sweeps across successive lines of a message sheet as it is advanced past the scanning aperture by the paper feed unit A. Any of various known types of optical scanning apparatus for flat-sheet scanning may be employed, although preferably the scanning apparatus is similar to that disclosed in the aforesaid Buckingham application U.S. Ser. No. 454,750, now Patent No. 2,903,512, except that the optical system thereof is improved; Figs. 14 and 15 are diagrammatic views of the improved optical system.

Fig. 11 is a view in elevation of the front end of the scanning unit, which end is adjacent to the vertical expanse of a message sheet as it is advanced by the paper feed unit past the scanning aperture 44' in the front end plate 44, portions of this plate being broken away to disclose various elements of the scanner. Fig. 12 is a view of the scanning unit removed from its light-proof casing 204 and looking down along the line 12—12 of Fig. 11 to show the drive mechanism of the scanner. The casing 204 is secured, as by machine screws, to the guide rails 18. The scanning unit is embodied in a removable metal tray, Fig. 12, the tray comprising the front plate 44, a bottom plate 200, side wall plates 201, and a rear end plate 202. The plates comprising the tray may be secured together in any suitable manner, such as by machine screws 206, seen in Fig. 11. The front panel 44 of the unit also carries jacks 208 which receive connecting plugs 85 (Fig. 7) in the paper feed unit when the units A and B are in their operative juxtaposed positions, thereby to releasably connect the electrical circuits to the paper feed unit.

As seen in Fig. 12, the scanning unit comprises a synchronous motor 210 having a toggle switch 209 mounted thereon for connecting and disconnecting the motor to a source of A.C. power. A synchronous A.C. chopper motor 212 rotates the light chopper disk 214 thereby to generate a carrier frequency from the scanning light beam source 216. The chopper apparatus and light source are mounted in a frame 211 and this frame is slidable on rods 215 carried by end bars 213, so that the position of the light source 216 may be adjusted at the desired optical distance with respect to an oscillatable spherical mirror, as hereinafter set forth. A set screw 217 maintains the unit 211 in the desired adjusted position. Preferably the light source 216 is a tungsten arc lamp of a type that provides a small round spot of scanning light. The light beam from the lamp 216 is interrupted by the chopper disk to generate a carrier frequency that is modulated in accordance with the light reflected from the scanned message sheet. Any suitable carrier frequency may thus be provided, for example, of the order of several thousand cycles per second. The tungsten concentrated arc lamp has electrodes enclosed in a gas-filled glass envelope. As disclosed in the aforesaid copending application of W. D. Buckingham Ser. No. 454,750, now Patent No. 2,903,512, the cathode of the arc lamp comprises a fine tungsten wire having formed on the end thereof a minute ball, the diameter of the ball corresponding approximately to the desired diameter of the light spot which falls on the message sheet. In operation the ball point will operate at a temperature of about 2800° to 3000° Kelvin which provides a brilliant point source of light approximately 8 to 10 mils. in diameter.

The scanning motor 210 drives a cross-shaft 222 through worm gears 220, the right hand end of the cross-shaft being mounted in a bearing 224 secured to the front plate 44, and the other end of the shaft being mounted in bearings in a bracket structure 230. A friction load band 226 is employed to provide a more uniform load on the motor 210. The cross-shaft also carries a flywheel 228 which assists in maintaining the speed of the shaft constant.

Mounted on the cross-shaft and rotated thereby is a circular flutter cam 241 having on the periphery thereof a cam groove 234. A spherical mirror 236 is carried by a V-shaped member 238 which is pivotally mounted at 240 so as to enable oscillatory movement of the spherical mirror. The member 238 carries at the upper end thereof a cam follower pin 242 which tracks in the spiral cam groove 234 so that as the cam 241 rotates, the reflector 236 is rapidly rocked back and forth through a limited angle as determined by the length of the scanning light track at the message sheet. The cam track 234 has a laterally curved quick-return portion, shown adjacent to the cam follower pin 242, the quick-return portion extending through an arc of approximately 18° of the periphery of the circular cam, the remainder of the groove 234 extending through an arc of approximately 342°. The shaft 222 also carries a blanking cam member 250 which has a cam lobe that extends through an arc of 18° which is equal to that of the return portion of the cam track 234, and as the cam rotates, normally open contact springs 252 are closed by the cam lobe to produce a blanking pulse having a time duration corresponding to that of the return interval. This blanking pulse is employed to suppress transmission of the facsimile pickup signals during the return sweep of the scanning beam. This blanking pulse may be used to control the transmitting circuit in various known ways to suppress transmission during this period, for example, to short-circuit the outgoing transmission line, or to control a blanking modulator circuit as disclosed in the pending application of L. G. Pollard et al. Ser. No. 261,461, filed December 13, 1951, now Patent No. 2,824,902, issued February 25, 1958, or to bias a rectifier to render it non-conductive as disclosed in the pending application of R. J. Wise, Ser. No. 261,560, filed December 13, 1951, now Patent No. 2,721,231, issued October 18, 1955, both of which cases are assigned to the assignee of the instant case. A cam 246 mounted on the shaft 222 has a lobe which controls contacts 248 in a circuit for effecting proper phasing of the transmitting apparatus with respect to a facsimile recorder in known manner.

Referring to the spherical reflector 236, this may comprise a conventional concave spectacle lens which is coated on the concave side with aluminum, silver or other reflecting material vaporized onto the surface to provide a front surface mirror. A thin surface coating of aluminum oxide or silicon monoxide is vaporized over the reflecting surface to produce a harder surface and thus minimize or prevent scratching. Such a mirror may be produced at a very low cost in contrast to expensive achromatic lenses heretofore regarded as necessary in optical scanning systems. In a commercial form of the present apparatus, the diameter of the mirror 236 is 36 millimeters, and its focal length is of the order of 11 inches. Since the focal length of the mirror is quite long relative to its diameter, spherical aberration effects are avoided.

In order to provide suitable definition in facsimile scanning, 100 scanning lines or more per linear inch are desirable. The drive motor 210 may, for example, have a speed of 1800 r.p.m., and with reducing gears 220 having a ratio of 5:1, this produces 360 oscillations of the scanning light beam per minute, the advancement of the message sheet being at a rate such that this scanning speed will produce approximately 100 scanning lines per inch. As the light beam is oscillated back and forth, scanning is effected only in one direction of movement of the beam, so that the return or retrace time of the beam after each scanning line largely represents lost time. In order to avoid this, a quick return at the end of each scanning line is obtained by the use of the quick-return portion of the flutter cam 241. This return time between successive scanning lines, as hereinbefore set forth, is only that required for the rotation of the flutter cam through an arc of approximately 18°, in contrast to the time required for the remainder of the cam groove which extends through an arc of approximately 342°; thus the return or retrace time of the light beam is effected in $\frac{1}{20}$ of a revolution of the flutter cam, the scanning light beam sweep being effected in the remaining $\frac{19}{20}$ of a revolution of the flutter cam. This causes the return or retrace operation to utilize but 5% of the time required for each line scanning cycle.

Referring to Fig. 11, a cylindrical reflector 260 may be seen through the scanning aperture 44' of the front plate 44, this plate having portions thereof broken away in the drawing in order to show various of the elements within the unit. The light reflected from the message sheet is directed by the cylindrical reflector onto two photocells 268 having their bases mounted in a receptacle 269 which encloses the circuit wiring to the photocells and which also may contain the amplifiers thereof. The photocells preferably are of the type having elongated cathodes. The cylindrical reflector 260 may be composed of a sheet of metal or other opaque material with the convex surface thereof polished or coated to provide a good reflecting surface. The reflector has apertures 261 and 262 therein. Behind the aperture 261 may be seen two plane mirrors 264 and 266 for directing the scanning light beam as hereinafter explained. Behind the aperture 262 is a "blanking" photocell 270, the base of which is mounted in a receptacle 271, this receptacle containing circuit wiring and an amplifier for the blanking photocell 270. If desired, the reflector 260 may be composed of a cylindrical sheet of a methacrylate resin, such as "Plexiglas" or "Lucite," or other transparent material such as glass. The resin or the glass is coated with silver or aluminum to provide the cylindrical mirror surface. Before such a sheet is coated masking strips are applied to the surface thereof to provide areas corresponding to the apertures 261 and 262 above referred to, so that the scanning light beam will pass through these transparent areas, although preferably these areas are cut out in order to prevent reflection losses.

Fig. 12 shows the blanking photocell 270 and its receptacle 271, and also shows a top edge view of one of the plane mirrors 266. Both of the plane mirrors 264 and 266 are mounted on sets of studs 274 received into the rear wall 202 of the metal tray. The studs are threaded to enable adjustment of the mirrors by means of nuts 276 and expansion springs 278, and the studs are so located with respect to each of the mirrors that each mirror is adjustable to the proper angle, both with respect to the vertical and horizontal, for receiving and deflecting the scanning light beam at the proper angle. A magnetic shield 280 is mounted on power supply apparatus supported by studs 282 from the rear wall 202 of the tray, the member 280 serving to shield the photocell from the electrostatic and electromagnetic fields generated by the power supply apparatus.

Referring to Fig. 14, there is diagrammatically shown the optical scanning system. The cylindrical reflector 260 has the characteristics in that the round scanning spot of light reflected from the surface of the message sheet $s$ at the point where the light falls on the sheet is collected by the reflector and is focused as a line of light on the cathodes of the two photocells 268 (only one of which appears in the figure due to the plane in which the view is taken), provided that the photocells and the illuminated line of the message sheet respectively are located at the conjugate foci of the reflector 260.

The source of light 216 is so positioned as to be substantially at the optical center of curvature of the spherical mirror 236, that is, the distance from the light source to the plane mirror 264 and back to the spherical mirror is equal substantially to the radius of curvature of the spherical mirror. Similarly, the message sheet at the point where the light beam impinges thereon is substantially at the optical center of curvature of the spherical mirror 236, that is, the distance from the mirror to the plane mirror 266 and back to the subject matter sheet $s$ is equal substantially to the radius of curvature of the mirror 236. When the message sheet $s$ is narrow and the scanning light beam travels off the sheet, the beam is reflected by the cylindrical reflector 188 onto the blanking photocell 270, and the latter photocell causes blanking signals to be generated for the reasons hereinbefore stated. The mirror 188 appears to be a plane mirror, but this is because the curvature thereof is not seen when viewed from the direction seen in Fig. 14.

A certain amount of the light reflected from the message sheet $s$ would ordinarily be reflected past the ends of the cylindrical reflector 260 and hence would be lost so far the pickup photocells 268 are concerned. This is obviated, however, by the use of two mirrors, preferably plane mirrors, respectively positioned at the ends of the cylindrical reflector 260; one of these mirrors 292 is seen in Fig. 14 and both the end mirrors 292 and 294 are seen in Fig. 15. The mirrors are disposed at the proper angles, preferably at right angles, with respect to the longitudinal axis of the cylindrical mirror, so that the light reflected from the message sheet toward the ends of the cylindrical mirror is captured by the end mirrors and reflected back onto the cylindrical mirror from which the light is directed onto the pickup photocells 268. This arrangement substantially adds to the total quantity of light received by the pickup photocells.

*Control circuit*

Figure 13:
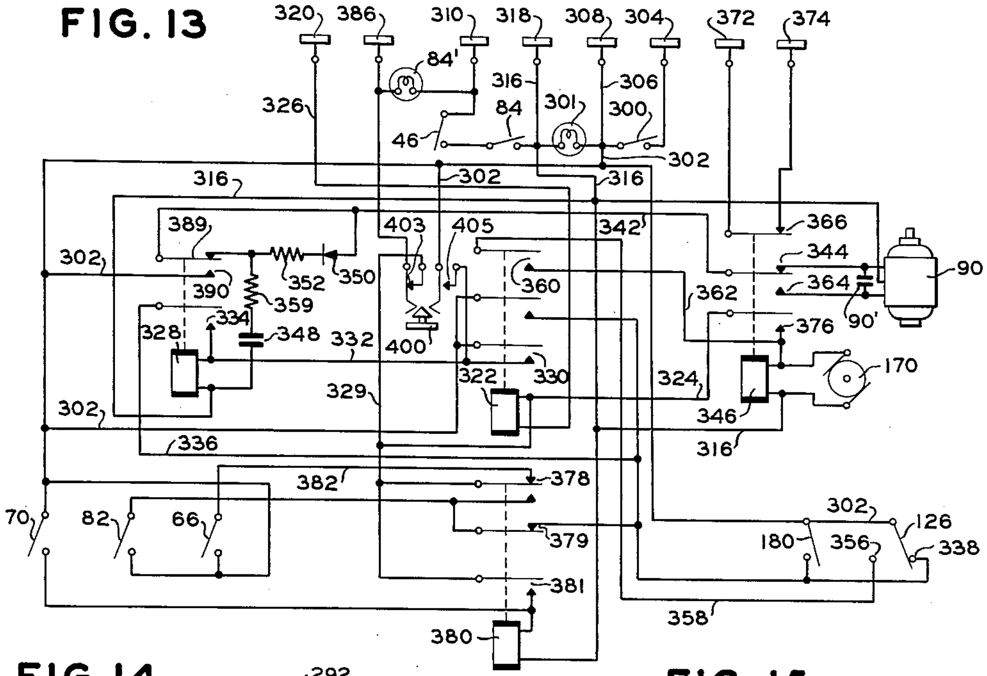
Fig. 13 is a wiring diagram showing electrical control circuits principally for the sheet-feeding unit.

Fig. 13 shows various of the circuit elements involved in the control equipment. The row of small rectangles at the top of the drawing identified by reference numerals 320, 386, etc., are detachable connectors, preferably of the plug and jack type, whereby the circuit may readily be connected to or disconnected from the facsimile line equipment. All relays and switches are shown in their normal positions prior to a transmitting operation. A power switch 300 when manually closed places the equipment in operative condition and supplies 110 v. A.C. power from the connector 304 to the relay control equipment by means of conductors 302, and also to certain other control equipment involved in the line equipment, by means of conductor 306 and connector 308. When a message sheet has been placed on the loading platform of the apparatus for transmission and the pressure roller 22 has been lowered onto the sheet, switch 46 is closed, completing a connection from the push-button start switch 84 to connector 310. A lamp 301 is lit over a circuit extending from the switch 300 and conductor 316 to a connector 318 which leads to the other side of the alternating current power supply circuit.

When the end-of-message indicator carriage 48 is manually moved to the proper position, for example, to the end of the subject matter to be scanned, switch 66 (shown in the lower portion of Fig. 13) is closed, as hereinbefore described, in order to partially prepare other circuits for subsequent operations. When the start button 84 is pushed, this completes a power supply circuit from connecting plug 318 by means of conductor 316, closed contacts of switch 46 to connector 310 and thence to the aforesaid line equipment. After the lapse of a warm-up period, for example, five to ten seconds, as determined by the line equipment, relay means in the line equipment complete a return circuit from connector 320 to the other side of the power line. This causes a relay 322 to be energized from conductor 329, which conductor previously had power applied thereto by the operation of switch 66, and a circuit comprising conductor 382 and break contacts 378 of a relay 380; the circuit continues through the operate winding of the relay 322 and the conductor 326 to the connector 320 and thence to the line equipment.

The operation of relay 322 causes relay 328 to operate from conductor 302 by means of make contacts 330 on operated relay 322, and conductor 332, through the operate winding of relay 328, conductor 316, and connector 318 to the other side of the power supply. The operation of relay 328 completes a holding circuit for the relay through its make contacts 334 and a circuit comprising conductor 336, normally closed contacts 338 of the flip switch 126, to conductor 302. Operated relay 328 also establishes a circuit through its armature 389 and make contacts 390, from conductor 302, through conductor 342, break contacts 344 of a relay 346, to one side of the winding of the paper feed motor 90, causing the motor to revolve in a direction that provides fast paper feed of the message blank. At the same time, a condenser 348 is charged from conductor 342 by means of a rectifier 350 connected to the power supply, through resistors 352 and 359 in series, the function of the resistors being to limit to a safe value the surge of charging current.

When a message sheet has been advanced through the feed rollers to the point where the subject matter is to be scanned, the flip switch 126 is operated as hereinbefore described, establishing a circuit from conductor 302, through the contacts 356 of the switch, conductor 358, make contacts 360 of operated relay 322, conductor 362 to the operate winding of a relay 346 and conductor 316 to the power supply. Relay 346 operates and transfers the connection to motor 90 to make contacts 364 of the relay, causing the motor to reverse and run in a direction that provides the slower scanning feed. A condenser 90′ is connected across one of the windings of the motor to provide an out-of-phase component to cause the motor to be self-starting. Contacts 366 of operated relay 346 open, removing a short circuit which was across the outgoing facsimile line connected to the control apparatus by connectors 372 and 374, during the fast feed operation. Facsimile signals are thereby permitted to pass from the facsimile transmitter to the distant recorder.

At the time that relay 346 operates, the timer motor 170 is also energized over the same circuit that energized relay 346. A holding circuit for the relay 346 is completed through its contacts 376 to conductor 324, break contacts 378 of unoperated relay 380, conductor 382, through the closed switch 66 to conductor 302. Operation of the flip switch 126 also opened the contacts 338 in a holding circuit for relay 328, but the latter relay does not release because power is supplied through contacts 330 of operated relay 322.

When the contacts of switch 66 are opened by the end-of-message mechanism previously described, power is thereby removed from conductor 382 and hence from conductor 329. This causes relay 322 to release and which, in turn, causes relay 346 to release and deenergize the timer motor 170. Power is also removed from the line equipment, and the busy light 84′ is extinguished. Release of relay 346 also transfers the connection to the feed motor 90 from contacts 364 to contacts 344 of the relay, thereby causing the motor to reverse its direction and effect fast paper feed. At the same time contacts 366 of relay 346 are reclosed, thus short-circuiting the facsimile signal transmitting line.

During the period of fast feed, the mechanism heretofore described causes momentary operations of the flip switch 126, once for each revolution of the disk 152 (shown on Fig. 4). Since paper is in the machine the switch 180 is operated and thereby establishes a circuit in parallel with contacts 338 of switch 126, preventing the opening of these contacts from affecting the remainder of the circuit. The momentary closures of the contacts 356 of the switch 126 also have no effect on the circuit since the associated conductor 358 terminates at the now open contacts 360 of relay 322.

When the trailing end of the message blank has passed the actuating arm of the switch 180, the switch is released and returns to its open circuit condition. The next operation of switch 126 opens contacts 338 and removes power from relay 328, causing the latter relay to release. The release of relay 328 removes A.C. power from the feed motor 90 and transfers the motor circuit, by the closure of contacts 389 of the relay, to the junction of resistors 352 and 359. The condenser 348 now discharges through resistor 359 and the feed motor 90, causing the motor to decelerate rapidly by dynamic braking effect. All relays are now deenergized and the circuit is in readiness for a new transmission.

In the case where a message of length greater than that of the loading platform 20 is to be transmitted, the control of message length provided by the end-of-message indicator carriage 47 and its associated mechanism is no longer effective since the maximum controlled length is limited by the length of platform 20 along which the indicator carriage travels. In such case the indicator carriage is drawn out to the end of its travel causing pin 74 on gear 56 to operate switch 70 by means of actuator 72. Switch 70 completes a circuit from conductor 302 through operate winding of relay 380 to the other side of the power supply. Operation of relay 380 disconnects switch 66 from the circuit by opening contacts 379, thereby causing switch 82 to have the same function in the circuit as that previously performed by switch 66. As shown in Fig. 9, switch 82 is operated by actuator 80, deflected from its normal position by the message sheet. Switch 82 is closed when in the operated condition. The operations of starting, fast feed-in, and normal scanning speed take place as described above. Movement of the end-of-message indicator carriage 47 through its associated mechanism causes switch 70 to open, but relay 380 remains operated by a holding circuit from conductor 329 through the new made contacts 381 of relay 380 to the operate winding of the same.

When the end of the message sheet passes the scanning line, actuator 80 is released and returns to its normal position causing switch 82 to open. Opening of switch 82 initiates the fast feedout function as previously described in connection with the opening of switch 66. Relay 380 is also thereby returned to its unoperated condition.

In the event that it is necessary to terminate a transmission prior to the operation of the end-of-message devices discussed above, reject button 400 is depressed. Contacts 403 open the circuit from conductor 302 through various other contacts as previously described to connector 386 and the line equipment. Release of relay means in the line equipment opens the return circuit from the operate winding of relay 322 through conductor 326 and connector 320. Relay 322 thereby releases and causes relay 346 to release, reversing motor 90 and causing fast paper feed as previously described. In the event that the reject button is operated at or near the start of a transmission, as will frequently be the case, flip switch 126 may operate before the message sheet has reached the actuator 182 of switch 180, causing relay 328 to be released and stopping the feed. In this case the reject button 400 may again be operated, and contacts 405 apply power through conductor 332 to the operate winding of relay 328. Operation of relay 328 closes make contacts 390 applying power to the motor 90 as before. This operation may be repeated as many times as necessary until switch 80 is closed, upon which the operation of the feed motor 90 will continue automatically until the message sheet has been ejected from the machine.

Various modifications of the apparatus illustrated, and various equivalents or substitutes for the devices depicted, may occur to those versed in the art without departing from the spirit and scope of the instant invention. The disclosure, therefore, is for the purpose of illustrating the principles of the invention which is not to be regarded as limited except as indicated by the scope of the appended claims.

What is claimed is:

1. In a facsimile transmitter in which the subject matter on a message sheet is scanned by a scanning light beam that is oscillated back and forth across the sheet at a scanning line position as the sheet is advanced through the transmitter, means whereby sheets bearing messages of different lengths may be scanned without the loss of time normally occasioned when scanning those portions of the sheets preceding and following the messages to be transmitted and to expedite the advancement of the sheets through the transmitter, comprising sheet feeding mechanism including means automatically operative to cause a sheet to be advanced uninterruptedly at a predetermined fast rate until the beginning of the message on the sheet approaches said scanning line position, means automatically operative to reduce the rate of advance of the sheet to a predetermined lower rate until scanning of the message is completed, and means automatically operative when scanning of the message is completed for again advancing the sheet uninterruptedly at a predetermined fast rate.

2. Apparatus according to claim 1, including manually operable means actuatable at any time while a message sheet is in the transmitter to prevent transmission of the message and to cause transmission to cease if it has started, and means responsive to the actuation of said manually operable means for causing the sheet feeding mechanism to effect continuous fast feed of the message sheet until it has passed completely through the transmitter.

3. Apparatus according to claim 1, including an outgoing facsimile transmission line, and means controlled by said sheet feeding mechanism for preventing transmission of facsimile pickup signals over said line during the intervals in which the message sheet is advanced at said fast rate.

4. Apparatus according to claim 3, in which circuit means including a relay controlled by the sheet feeding mechanism is operative to disable said outgoing facsimile transmission line during the intervals in which the message sheet is advanced at said fast rate.

5. Apparatus according to claim 4, in which said relay is operative to short-circuit said outgoing facsimile transmission line during the intervals in which the message sheet is advanced at said fast rate.

6. In a facsimile transmitter in which the subject matter on a message sheet is scanned by a scanning light beam that is oscillated back and forth across the sheet at a scanning line position as the sheet is advanced through the transmitter, means whereby sheets bearing messages of different lengths may be scanned without the loss of time normally occasioned when scanning those portions of the sheets preceding and following the message to be transmitted and to expedite the advancement of the sheets through the transmitter, comprising sheet feeding mechanism including a reversible motor and means driven thereby when the motor is rotating in one direction to cause a sheet to be advanced uninterruptedly at a predetermined fast rate until the beginning of the message on the sheet approaches said scanning line position, means for reversing said motor and means driven thereby when the motor is rotating in the opposite direction to reduce the rate of advance of the sheet to a predetermined lower rate until scanning of the message is completed, and means for again reversing said motor and including said first means driven thereby and operative when scanning of the message is completed for again advancing the sheet uninterruptedly at a predetermined fast rate.

7. In a facsimile transmitter in which the subject matter on a message is scanned by a scanning light beam that is oscillated back and forth across the sheet at a scanning line position as the sheet is advanced through the transmitter, means whereby sheets bearing messages of different lengths may be scanned without the loss of time normally occasioned when scanning those portions of the sheets preceding and following the message to be transmitted and to expedite the advancement of the sheets through the transmitter, comprising sheet feeding mechanism including a reversible motor and a gear train and clutch structure driven thereby and operative when the motor is rotating in one direction to cause a sheet to be advanced uninterruptedly at a predetermined fast rate until the beginning of the message on the sheet approaches said scanning line position, means for reversing said motor and a gear train and clutch structure driven thereby and operative when the motor is rotating in the opposite direction to reduce the rate of advance of the sheet to a predetermined lower rate until scanning of the message is completed, and means for again reversing said motor and including the first named gear train and clutch structure operative when scanning of the message is completed for again advancing the sheet uninterruptedly at a predetermined fast rate.

8. In a facsimile transmitter in which the subject matter on a message sheet is scanned by a scanning light beam that is oscillated back and forth across the sheet at a scanning line position as the sheet is advanced through the transmitter, means whereby sheets bearing messages of different lengths may be scanned without the loss of time normally occasioned when scanning those portions of the sheets preceding and following the message to be transmitted and to expedite the advancement of the sheets through the transmitter, comprising a loading platform on which a message sheet may be placed with the subject matter thereon exposed to view, sheet feed mechanism including a sheet-advancing member and means manually operable for causing said member to engage said sheet at a place correlated to the beginning of the message thereon, an end-of-message indicator device manually settable to a position correlated to the end of the message on said sheet, timer means operative to cause the feed mechanism to advance said sheet uninterruptedly at a predetermined fast rate until the beginning of the message on the sheet approaches said scanning line position, means controlled by said timer means and operative to reduce the rate of advance of the sheet to a predetermined lower rate until scanning of the message is completed, and means controlled by said end-of-message indicator device and operative when scanning of the message is completed for again advancing the sheet uninterruptedly at a predetermined fast rate.

9. Apparatus according to claim 8, including means operative to cause continuous transmission of a message of indeterminate length or a series of successive individual messages.

10. Apparatus according to claim 8, in which said end-of-message indicator device is manualy settable to a position which indicates that a message of indefinite length or a series of successive individual messages will be transmitted, and means controlled by said indicator device for causing the continuous transmission thereof.

11. In a facsimile transmitter in which the subject matter on a message sheet is scanned by a scanning light beam that is oscillated back and forth across the sheet at a scanning line position as the sheet is advanced through the transmitter, means whereby sheets bearing messages of different lengths may be scanned without the loss of time normally occasioned by scanning those portions of the sheets preceding and following the message to be transmitted and to expedite the advancement of the sheets through the transmitter, comprising a loading platform on which a message sheet may be placed with the subject matter thereon exposed to view, sheet feed mechanism including a feed roller and means manually operable for causing said roller to engage said sheet at a place correlated to the beginning of the message thereon, and end-of-message indicator device manually settable to a position correlated to the end of the message on said sheet, structure comprising a track and means for causing said indicator device to travel along said track concurrently with the advancement of said sheet, timer means operative to cause the feed mechanism to advance said sheet uninterruptedly at a predetermined fast rate until the beginning of the message on the sheet approaches said scanning line position, means controlled by said timer means and operative to reduce the rate of advance of the sheet to a predetermined lower rate until scanning of the message is completed, and means controlled by said end-of-message indicator device when it has traveled a distance which indicates that scanning of the message is completed for again advancing the sheet uninterruptedly at a predetermined fast rate.

References Cited in the file of this patent

UNITED STATES PATENTS

| | | |
|---|---|---|
| 1,788,476 | Watson | Jan. 13, 1931 |
| 1,877,279 | Dawson | Sept. 20, 1932 |
| 2,055,513 | Whitaker | Sept. 29, 1936 |
| 2,059,879 | La Pierre | Nov. 3, 1936 |
| 2,173,164 | Hansell | Sept. 19, 1939 |
| 2,287,413 | Bruce | June 23, 1942 |
| 2,333,272 | Ridings | Nov. 2, 1943 |
| 2,601,236 | Asten | June 24, 1952 |
| 2,718,548 | Jelinek | Sept. 20, 1955 |